(12) United States Patent
Lee et al.

(10) Patent No.: US 7,516,382 B2
(45) Date of Patent: Apr. 7, 2009

(54) ON-CHIP DATA TRANSMISSION CONTROL APPARATUS AND METHOD

(75) Inventors: Hyung-Dong Lee, Kyoungki-do (KR); Eun-Jung Jang, Kyoungki-do (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 241 days.

(21) Appl. No.: 11/292,734

(22) Filed: Dec. 1, 2005

(65) Prior Publication Data
US 2006/0150044 A1    Jul. 6, 2006

(30) Foreign Application Priority Data
Dec. 30, 2004   (KR) .................... 10-2004-0116669

(51) Int. Cl.
*G01R 31/28* (2006.01)
(52) U.S. Cl. ...................................... 714/736
(58) Field of Classification Search .................. 714/736
See application file for complete search history.

(56) References Cited

U.S. PATENT DOCUMENTS

| | | | | |
|---|---|---|---|---|
| 5,701,293 | A * | 12/1997 | Fujii | 370/244 |
| 6,055,660 | A * | 4/2000 | Meaney | 714/732 |
| 6,992,506 | B2 * | 1/2006 | Park et al. | 326/52 |
| 7,043,670 | B2 * | 5/2006 | Alani et al. | 714/47 |
| 7,082,489 | B2 * | 7/2006 | Yeh et al. | 710/305 |
| 2003/0041223 | A1 * | 2/2003 | Yeh et al. | 711/167 |

FOREIGN PATENT DOCUMENTS

| | | |
|---|---|---|
| GB | 2394088 | 4/2004 |
| KR | 1998-044202 | 9/1998 |
| KR | 2001-0100765 | 11/2001 |
| KR | 2003-0083237 | 10/2003 |

OTHER PUBLICATIONS

Behrooz Parhami, "Design of m-out-of-n-Bit Voters," Signals, Systems and Computers, Nov. 1994, pp. 1260-1264, vol. 2, 1058-6393/91 1991 IEEE.

* cited by examiner

*Primary Examiner*—James C Kerveros
(74) *Attorney, Agent, or Firm*—Blakely, Sokoloff, Taylor & Zafman LLP (57) ABSTRACT

The on-chip data transmission controller comprises a data comparison unit for comparing current data with previous data and issuing an inversion flag if the number of data bits phase-transited is larger than a preset number, a first data inversion unit for inverting a phase of the current data when the inversion flag is activated and providing inverted data onto a data bus, and a second data inversion unit for inverting a phase of the data transmitted via the data bus when the inversion flag is activated and outputting inverted data. Through this controller, an on-chip noise that largely occurs as the number of data to be transmitted increases can be reduced, by decreasing transition number of data inputted via the GIO line, in case of using a multi step pre-patch structure to improve an operation speed of a memory device.

16 Claims, 12 Drawing Sheets

| IO(n-1) | IO(n) | XOR | 1st | 2nd | 3rd | 4th | Flag | GIO(n) |
|---|---|---|---|---|---|---|---|---|
| 0 | 0 | 0 | 0 | 0 | 0 | 1 | | 0 |
| 0 | 0 | 0 | 0 | 0 | 0 | 1 | | 0 |
| 0 | 0 | 0 | 0 | 0 | 0 | 1 | | 0 |
| 0 | 0 | 0 | 0 | 0 | 0 | 1 | | 0 |
| 0 | 1 | 1 | 1 | 1 | 1 | 0 | | 1 |
| 0 | 1 | 1 | 1 | 1 | 1 | 0 | | 1 |
| 0 | 1 | 1 | 1 | 1 | 1 | 0 | | 1 |
| 0 | 1 | 1 | 1 | 1 | 1 | 0 | | 1 |

| IO(n-1) | IO(n) | XOR | 1st | 2nd | 3rd | 4th | Flag | GIO(n) |
|---|---|---|---|---|---|---|---|---|
| 0 | 0 | 0 | 0 | 1 | 1 | 1 | | 1 |
| 0 | 0 | 0 | 0 | 0 | 0 | 1 | | 1 |
| 0 | 0 | 0 | 1 | 0 | 0 | 1 | | 1 |
| 0 | 1 | 1 | 0 | 0 | 0 | 1 | | 0 |
| 0 | 1 | 1 | 1 | 1 | 1 | 0 | | 0 |
| 0 | 1 | 1 | 1 | 1 | 1 | 0 | | 0 |
| 0 | 1 | 1 | 1 | 1 | 1 | 0 | | 0 |
| 0 | 1 | 1 | 1 | 1 | 1 | 1 | | 0 |

| IO(n-1) | IO(n) | XOR | 1st | 2nd | 3rd | 4th | Flag | GIO(n) |
|---|---|---|---|---|---|---|---|---|
| 1 | 0 | 1 | 1 | 1 | 1 | 1 | | 0 |
| 1 | 0 | 1 | 1 | 1 | 1 | 1 | | 0 |
| 1 | 0 | 1 | 1 | 1 | 1 | 1 | | 0 |
| 1 | 0 | 1 | 1 | 1 | 1 | 1 | | 0 |
| 1 | 1 | 0 | 0 | 0 | 0 | 0 | | 1 |
| 1 | 1 | 0 | 0 | 0 | 0 | 0 | | 1 |
| 1 | 1 | 0 | 0 | 0 | 0 | 0 | | 1 |
| 1 | 1 | 0 | 0 | 0 | 0 | 0 | | 1 |

| IO(n-1) | IO(n) | XOR | 1st | 2nd | 3rd | 4th | Flag | GIO(n) |
|---|---|---|---|---|---|---|---|---|
| 1 | 0 | 1 | 1 | 1 | 1 | 1 | | 1 |
| 1 | 0 | 1 | 1 | 1 | 1 | 1 | | 1 |
| 1 | 0 | 1 | 1 | 1 | 1 | 1 | | 1 |
| 1 | 0 | 1 | 1 | 1 | 1 | 1 | | 1 |
| 1 | 0 | 1 | 1 | 1 | 1 | 1 | | 1 |
| 1 | 1 | 0 | 0 | 0 | 0 | 0 | | 0 |
| 1 | 1 | 0 | 0 | 0 | 0 | 0 | | 0 |
| 1 | 1 | 0 | 0 | 0 | 0 | 0 | | 0 |

ON-CHIP DATA TRANSMISSION CONTROL APPARATUS AND METHOD

FIELD OF THE INVENTION

The present invention relates to an on-chip data transmission; and more particularly, to an on-chip data transmission control apparatus and method capable of improving an operation characteristic of a chip device by suppressing an issuance of on-chip noise. This is accomplished by inverting, if a rate of data transited ("transition rate") is higher than a preset rate after sensing a number of data bits phase-transited ("transition number") in data outputted via a data bus, data to be transmitted and lowering the transition rate.

DESCRIPTION OF RELATED ART

Figure 1:
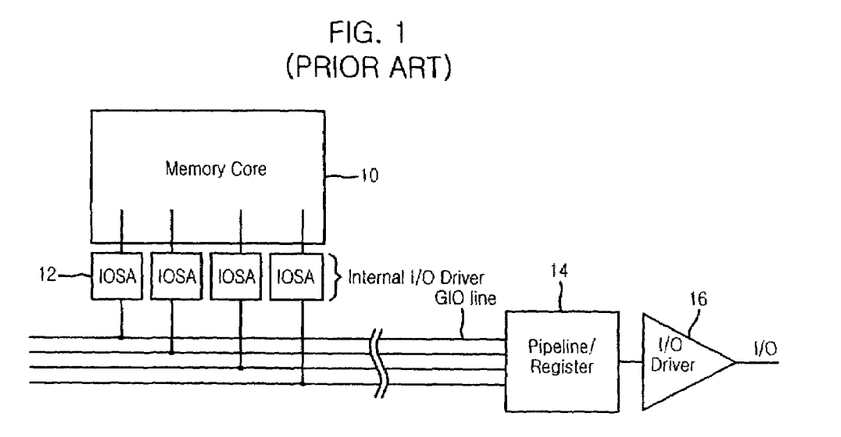
FIG. 1 is a circuit diagram showing a configuration of a conventional on-chip data output apparatus.

FIG. 1 is a circuit diagram showing a configuration of a conventional on-chip data output apparatus.

Specifically, FIG. 1 depicts a configuration of the conventional on-chip data output apparatus that employs one external input/output (I/O) and 4-bit pre-patch. In this structure, the number of I/O substantially necessary for communication with the outside is one and an operation speed of a memory core 10 is considerably slower than an operation frequency of external clock. Thus, in order to output data in synchronization with the external clock, the general on-chip data output apparatus simultaneously outputs 4 internal I/O data from the memory core 10 by a single access using 4 internal I/O drivers (hereinafter, called "IOSA") 12. Subsequently, the outputted 4 internal I/O data are registered in a pipeline or register 14 via a global input and output (GIO) line and then outputted to outside through an I/O driver 16 in series by means of ordering the same in a given way, for example, using access address.

In the prior art data output apparatus, an access rate of first data is the same as an instance of applying no pre-patch, but an access rate of second to fourth data is at a high rate since it is limited to only the pipeline or register 14 placed on an output side, not by the memory core 10.

Under this operation state, if the number of data to be transmitted increases by the number of pre-patch, the number of data transited by the single access increases. For instance, if a device with x32 external I/O adopts 4-bit pre-patch, the number of data to be transmitted is 128. As such, if the data is numerous, instantaneous current becomes much increased depending on transition of the data. This induces a chip-on noise and in turn leads to a malfunctioning of the chip.

SUMMARY OF THE INVENTION

It is, therefore, a primary object of the present invention to provide an on-chip data transmission control apparatus and method capable of improving an operation characteristic of a chip device by minimizing an issuance of noise due to transition of data transmitted by an improvement of a structure of the existing on-chip data output apparatus.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

In accordance with one aspect of the present invention, there is provided an on-chip data transmission control apparatus comprising: a data comparison unit for comparing current data with previous data and issuing, if the number of data bits phase-transited is larger than a preset number, an inversion flag; a first data inversion unit for inverting a phase of the current data when the inversion flag is activated and providing inverted data onto a data bus; and a second data inversion unit for inverting a phase of the data transmitted via the data bus when the inversion flag is activated and outputting inverted data.

In accordance with another aspect of the present invention, there is provided an on-chip data transmission control apparatus comprising: a data comparison unit for comparing current data with previous data and issuing, if the number of data bits phase-transited is larger than a preset number, an inversion flag; a data inversion unit for inverting a phase of the current data when the inversion flag is activated and providing inverted data onto a data bus; an input and output (IO) driver for temporarily storing data transmitted via the data bus and providing the stored data onto an external IO line; and a flag IO driver for temporarily storing the inversion flag and outputting the stored data to outside.

In accordance with still another aspect of the present invention, there is provided an on-chip data transmission control method comprising the steps of: (a) comparing current data with previous data and issuing, if the number of data bits phase-transited is larger than a preset number, an inversion flag; (b) inverting a phase of the current data when the inversion flag is activated and sending inverted data onto a data bus; and (c) inverting a phase of the current data sent via the data bus when the inversion flag is activated and outputting inverted data.

In accordance with still yet another aspect of the present invention, there is provided an on-chip data transmission control method comprising the steps of: (a) comparing current data with previous data and issuing, if the number of data bits phase-transited is larger than a preset number, an inversion flag; and (b) inverting a phase of the current data when the inversion flag is activated and outputting inverted data and the inversion flag to outside.

Hereinafter, a preferred embodiment of the present invention will be explained in detail with reference to the accompanying drawings.

Figure 2:
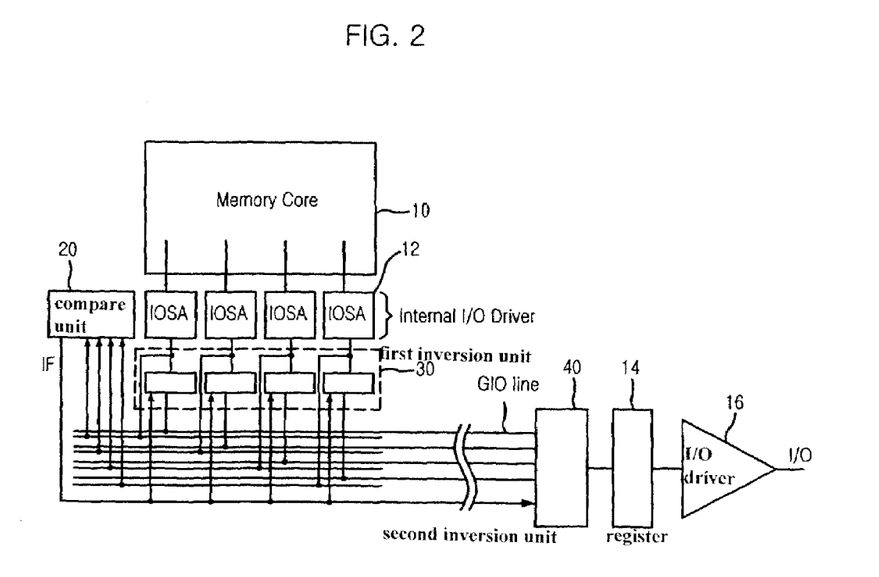
FIG. 2 is a circuit diagram representing a configuration of an on-chip data transmission control apparatus in accordance with a first embodiment of the present invention.

FIG. 2 is a circuit diagram showing a configuration of an on-chip data transmission control apparatus in accordance with the present invention.

In FIG. 2, same reference numbers are given to composition elements conducting the same function as in FIG. 1, and their details are omitted here for the purpose of simplicity.

The on-chip data transmission control apparatus of the invention comprises a data comparison unit 20, and a first and a second data inversion units 30 and 40.

Specifically, the data comparison unit 20 compares a state of current data with that of previous data, which are provided from an IOSA 12, and, if a rate of phase-transited data is larger than a preset rate, outputs an inversion flag IF. In other words, the data comparison unit 20 temporarily stores previously outputted data (hereinafter, called "the (n−1)th data") and then compares it with currently outputted data (hereinafter, called "the nth data"). For example, if the number of data bits with different state, i.e., different phase is larger than the preset number, then it generates the inversion flag IF.

The first inversion unit 30 inverts a phase of the nth data from the IOSA 12 when the inversion flag IF is activated, and outputs inverted nth data onto a GIO line.

The second inversion unit 40 again inverts a phase of the inverted nth data transmitted via the GIO line when the inversion flag IF is activated, to provide the original nth data with the same phase as the data from the memory core 10 to a pipeline or register 14.

Figure 3:
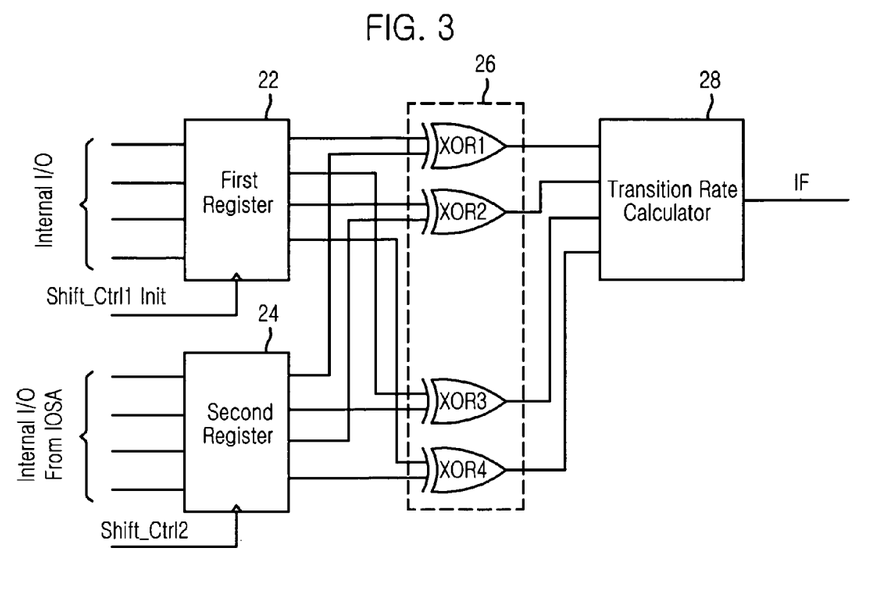
FIG. 3 is a detailed circuit diagram showing a configuration of the data comparison unit depicted in FIG. 2.

FIG. 3 shows a circuit diagram representing a detailed configuration of the data comparison unit 20 in FIG. 2.

The data comparison unit 20 of FIG. 3 includes a first and a second registers 22 and 24, a state change sensor 26, and a transition rate calculator 28.

Specifically, the first register 22 temporarily stores and then outputs the (n−1)th data from the IOSA 12, in response to a shift clock signal Shift_ctrl1 and an initialization signal init.

The second register 24 temporarily stores the nth data from the IOSA 12, in response to a shift clock signal Shift_ctrl2.

The state change sensor 26 compares the (n−1)th data stored in the first register 22 with the nth data stored in the second register 24. In the comparison, if a phase of the nth data is different from that of the (n−1)th data, then it activates a state sensing signal corresponding to each phase-changed data bit at high level and provides the same to the transition rate calculator 28; and if otherwise, it activates a state sensing signal corresponding to each data bit with same phase at low level and provides the same to the transition calculator 28. This state change sensor 26 includes a plurality of, e.g., four exclusive OR gates XOR1 to XOR4, which have the number corresponding to the number of data bits transmitted via the GIO line, for inputting the data bits from the first and the second registers 22 and 24 one by one and outputting, if states of the corresponding two data bits are different each other, a state sensing signal of high level corresponding to those data bits.

Thereafter, the transition rate calculator 28 checks if there occurs phase transition of any of internal data bits based on the state sensing signals from the state change sensor 26. In the checking process, if the number of the phase-transited data bits is larger than the preset number, i.e., if the transition rate is higher than the preset rate, it generates the inversion flag IF.

Figure 4:
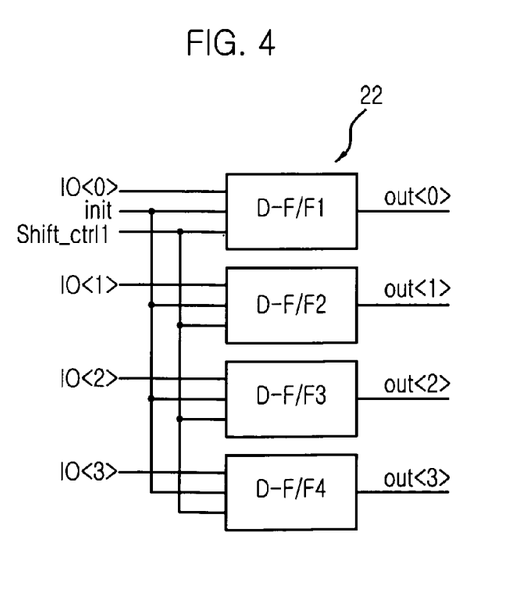
FIG. 4 is a detailed circuit diagram showing a configuration of the first register depicted in FIG. 3.
Figure 5:
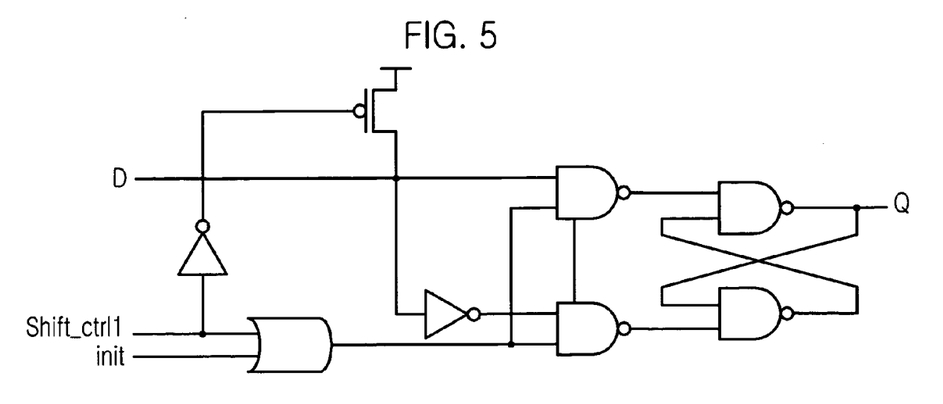
FIG. 5 is a detailed circuit diagram showing a configuration of each D-F/F in FIG. 4.

FIG. 4 is a configuration diagram showing a structure of the first register 22 in FIG. 3 in more detail, and FIG. 5 presents a detailed circuit diagram of each D-F/F depicted in FIG. 4.

First of all, the first register 22 latches and outputs the internal data IO<0> to IO<3> in response to the shift clock signal Shift_ctrl1. To be more specific, the first register 22 is provided with four D flip-flops D-F/F1 to D-F/F4 with latch structure as shown in FIG. 5; and in response to the shift clock signal Shift_ctrl1, it inputs the internal data IO<0> to IO<3> from the GIO line through its D port for their latch and registration, and simultaneously outputs data out<0> to out<3> via a Q port. At this time, each D-F/F is initialized by the initialization signal init.

Figure 6:
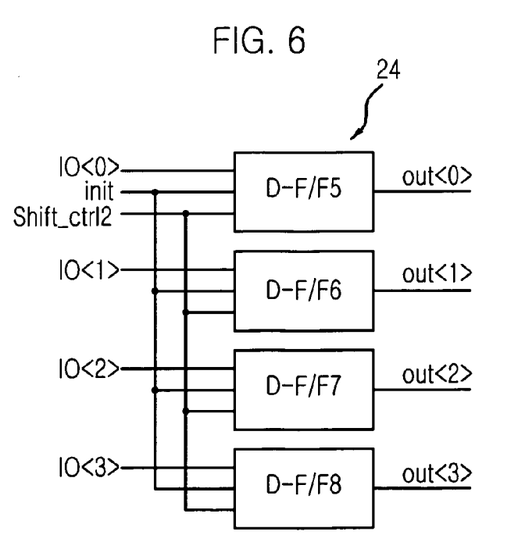
FIG. 6 is a detailed circuit diagram showing a configuration of the second register depicted in FIG. 3.
Figure 7:
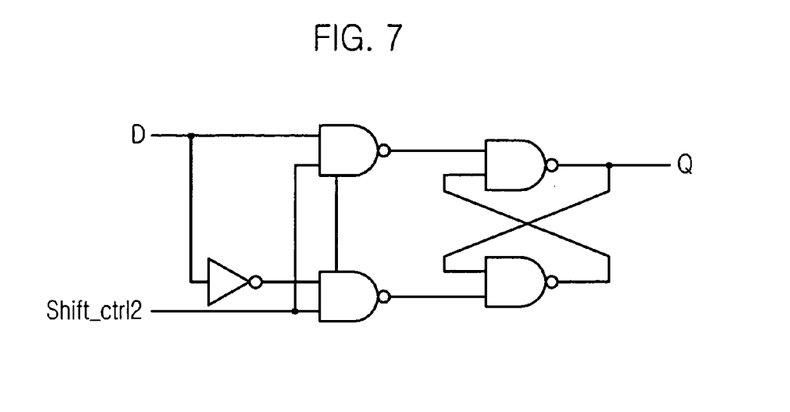
FIG. 7 is a detailed circuit diagram showing a configuration of each D-F/F in FIG. 6.

FIG. 6 is a configuration diagram showing a structure of the second register 24 depicted in FIG. 3 particularly, and FIG. 7 is a detailed circuit diagram of each D-F/F in FIG. 6.

The second register 24 latches and outputs the internal data IO<0> to IO<3> in response to the shift clock signal Shift_ctrl2. Specifically, the second register 24 is provided with four D flip-flops D-F/F5 to D-F/F8 with latch structure as shown in FIG. 7; and in response to the shift clock signal Shift_ctrl2, it inputs the internal data IO<0> to IO<3> from the GIO line through its D port for their latch and registration, and simultaneously outputs data out<0> to out<3> via a Q port.

Figure 8:
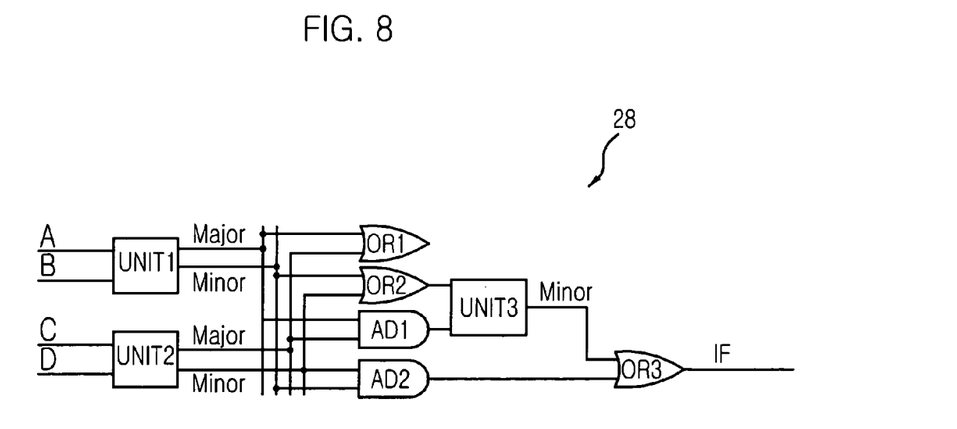
FIG. 8 is a detailed circuit diagram showing a configuration of the transition calculator depicted in FIG. 3.

FIG. 8 is a detailed circuit diagram of the transition rate calculator 28 depicted in FIG. 3.

The transition calculator 28, as shown in FIG. 8, includes three unit shifters UNIT1 to UNIT3, three OR gates OR1 to OR3, and two AND gates AD1 and AD2.

The first unit shifter UNIT1 receives a first and a second state sensing signals A and B to identify their states; and if states of the two signals A and B are different, it shifts and outputs the high level signal to a first output port Major and the low level signal to a second output port Minor.

The second unit shifter UNIT2 receives a third and a fourth state sensing signals C and D to discern their states; and if states of the two signals C and D are different, it shifts and outputs the high level signal to a first output port Major and the low level signal to a second output port Minor.

The first OR gate OR1 logically sums the signal from the first output port Major of the first unit shifter UNIT1 and the signal from the first output port Major of the second unit shifter UNIT2.

second OR gate OR2 logically adds the signal from the second output port Minor of the first unit shifter UNIT1 to the signal from the second output port Minor of the second unit shifter UNIT2, and outputs a result of the OR addition to the third unit shifter UNIT3.

The first AND gate AD1 logically multiplies the signal from the first output port Major of the first unit shifter UNIT1 by the signal from the first output port Major of the second unit shifter UNIT2, and outputs a product of the logical multiplication to the third unit shifter UNIT3.

The second AND gate AD2 logically multiplies the signal from the second output port Minor of the first unit shifter UNIT1 by the signal from the second output port Minor of the second unit shifter UNIT2, and outputs a product of the logical multiplication to the third OR gate OR3.

The third unit shifter UNIT3 inputs the output signal from the second OR gate OR2 and the output signal from the first AND gate AD1 to identify their states; and if states of the two signals are different, it shifts and outputs a low level signal to an output port Minor.

The third OR gate OR3 logically sums the signal from the second output port Minor of the third unit shifter UNIT3 and the signal from the second AND gate AD2, and produces the inversion flag IF.

Figure 9:
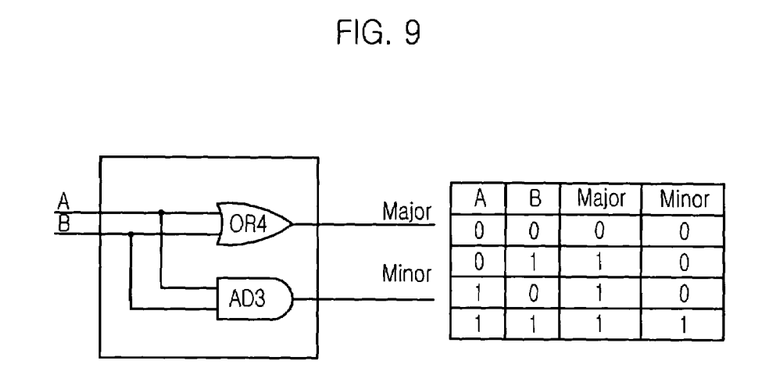
FIG. 9 is a detailed circuit diagram showing a configuration of each unit shifter in FIG. 8.

FIG. 9 is a diagram representing a detailed configuration of each of the unit shifters UNIT1 to UNIT3 depicted in FIG. 8. These unit shifters UNIT1 to UNIT3 have the same composition elements; and therefore, only one of them, e.g., UNIT1, will be explained in detail below.

Specifically, the first unit shifter UNIT1 includes an OR gate OR4 for inputting the first and the second state sensing signals A and B and performing logical addition operation on the signals, and a third AND gate AD3 for conducting logical multiplication operation of the above two signals. That is, if states of the two state sensing signals A and B are different each other, the first unit shifter UNIT1 provides the high level signal to the first output port Major and the low level signal to the second output port Minor, as given in the truth table of FIG. 9. And, if states of the two state sensing signals A and B are the same, the first unit shifter UNIT1 outputs the signal with the same level as the signal level applied thereto to the first and the second output ports Major and Minor. In FIG. 8, it should be noted that only the second output port Minor is indicated since the output signal from that port is used in the third unit shifter UNIT3.

Now, the operation of the transition calculator 28 in FIG. 8 will be described simply with reference to FIGS. 8 and 9.

The outputs from the first output ports Major of the first and the second unit shifters UNIT1 and UNIT2 are high level signals if at least one of the input signals thereto is in high level, i.e., if state of at least one of the inputs is transited. And, the outputs from the second output ports Minor are high level signals if all of the input signals thereto are in high level, i.e., if states of all of the inputs are transited.

Thus, the output signal of the second OR gate OR2 has high level if at least one of the signals applied thereto from the second output ports Minor of the first and the second unit shifters UNIT1 and UNIT2 is in high level. At this time, the signals from the second output ports Minor of the first and the second unit shifters UNIT1 and UNIT2 have high level only if all of the signals thereto are high level. Thus, the output signal from the second OR gate OR2 has high level if at least all of the two nth data corresponding to the two state sensing signals A and B are transited, at least all of the two data corresponding to the two nth state sensing signals C and D are transited, or all of the above four nth data are transited.

Thereafter, the output signal from the first AND gate AD1 becomes logic high if at least one of the two nth data corresponding to the two state sensing signals A and B is transited and at least one of the two nth data corresponding to the two state sensing signals C and D is transited.

Accordingly, as mentioned early, the output signal from the third unit shifter UNIT3 is logic high if the output from the second OR gate OR2 is logic high signal and the output from the first AND gate AD1 is logic high signal, i.e., if at least three of the above four nth data are transited.

Further, the output signal from the second AND gate AD2 is in high level if the signals from the second output ports Minor of the first and the second unit shifters UNIT1 and UNIT2 are all high level, i.e., if the four nth data are all transited.

Thus, the inversion flag IF is activated at logic high if at least three of the above four nth data are transited.

Figure 10:
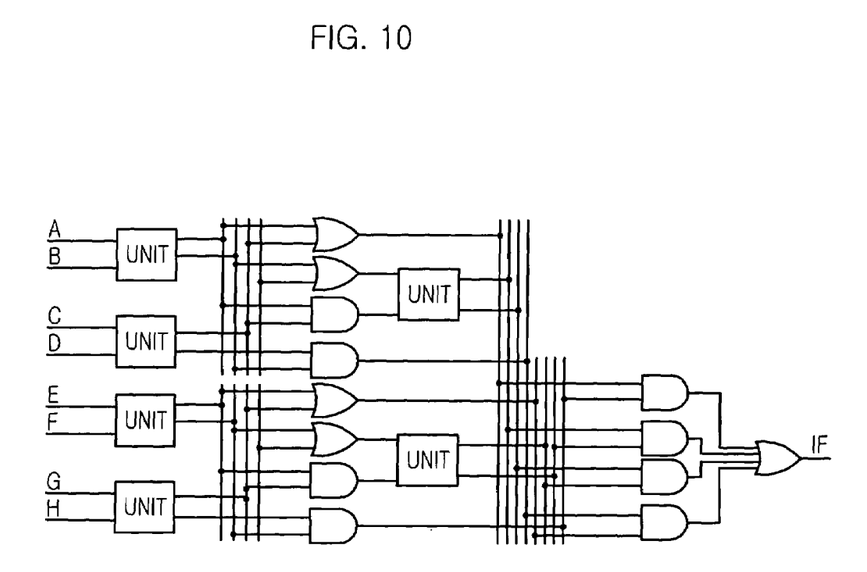
FIG. 10 is a detailed circuit diagram showing a configuration of an instance of expanding the transition rate calculator depicted in FIG. 8 to 8-bit.

FIG. 10 is a circuit diagram showing a circuit configuration of an instance of expanding the transition rate calculator 28 depicted in FIG. 8 to 8-bit.

FIG. 10 also employs the same operational principle as FIG. 8, wherein in FIG. 10 it is designed that the inversion flag IF is activated at logic high if at least five of eight nth data are transited.

Figure 11:
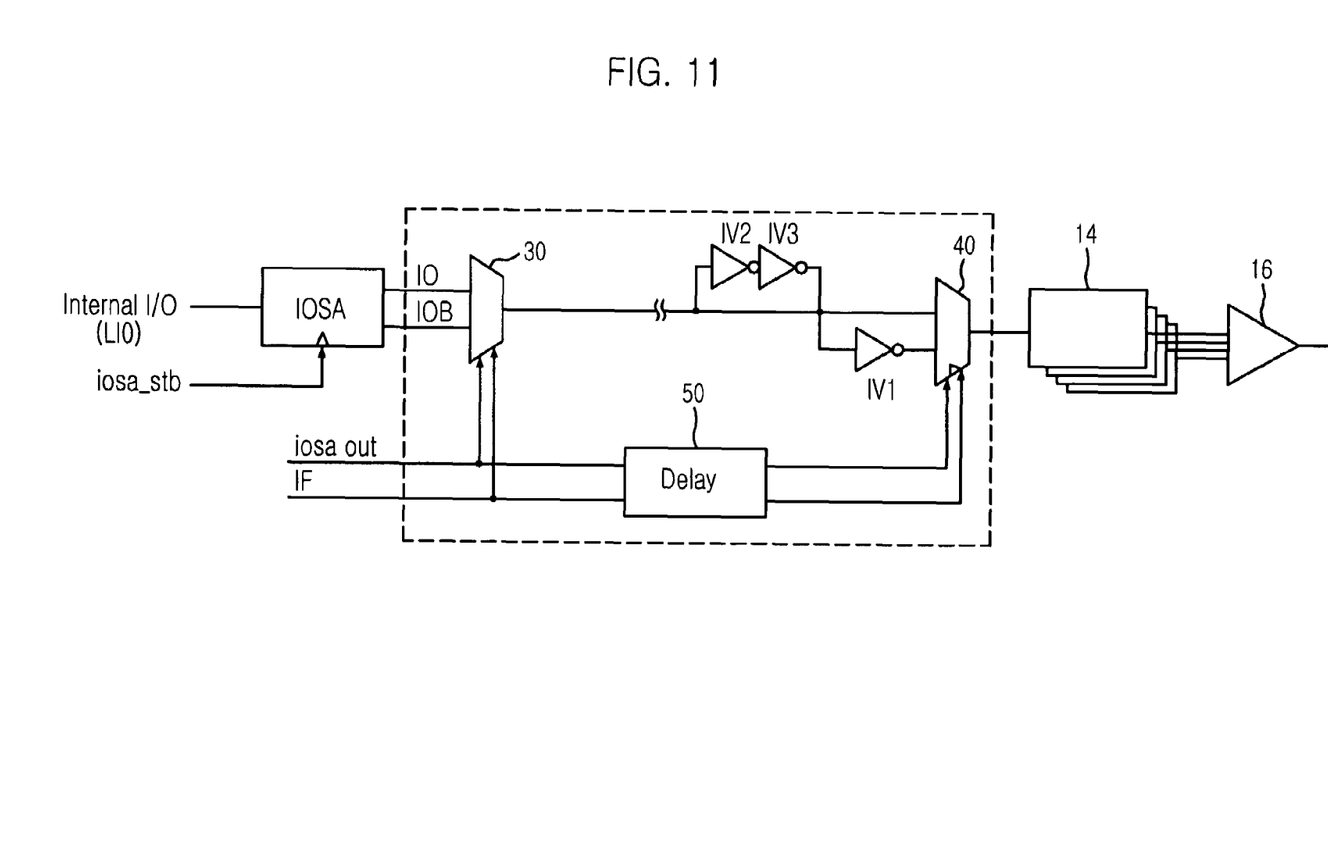
FIG. 11 is a diagram showing the relationship between the first and the second data inversion units in FIG. 2 more particularly.

FIG. 11 is a configuration diagram showing the relationship between the first and the second data inversion units 30 and 40 depicted in FIG. 2 more particularly.

The first data inversion unit 30 receives differential data IO and IOB of the data through the IOSA 12 from the memory core 10, and selectively outputs one of the two data IO and IOB onto the GIO line in response to the inversion flag IF and a data output signal iosa_out. In other words, under the state where the data output signal iosa_out is activated, the first data inversion unit 30 outputs the data IO onto the GIO line as it is if the inversion flag is inactivated at logic low, and the data IOB onto the GIO line if the inversion flag is activated at logic high, thereby outputting the inverted data.

Inverters IV1 and IV2 buffer the data on the GIO line for a certain time and then output the same onto the GIO line again; and an inverter IV3 inverts the data on the GIO line and outputs inverted data to the second data inversion unit 40.

The second data inversion unit 40 selectively outputs the output signal from the first data inversion unit 30 or the output signal from the inverter IV3 in response to the inversion flag IF and the data output signal iosa_out so that the original data from the memory core 10 can be registered in the pipeline or register 14 by recovering the original phase from the phase-inverted data by the first data inversion unit 30.

A delay circuit 50 delays the inversion flag IF and the data output signal iosa_out by a time period when the data is transmitted from the IOSA 12 to the GIO line, to compensate a delay during the transmission. The inversion flag IF and data output signal iosa_out so delayed are then delivered to the second data inversion unit 40.

Figure 12:
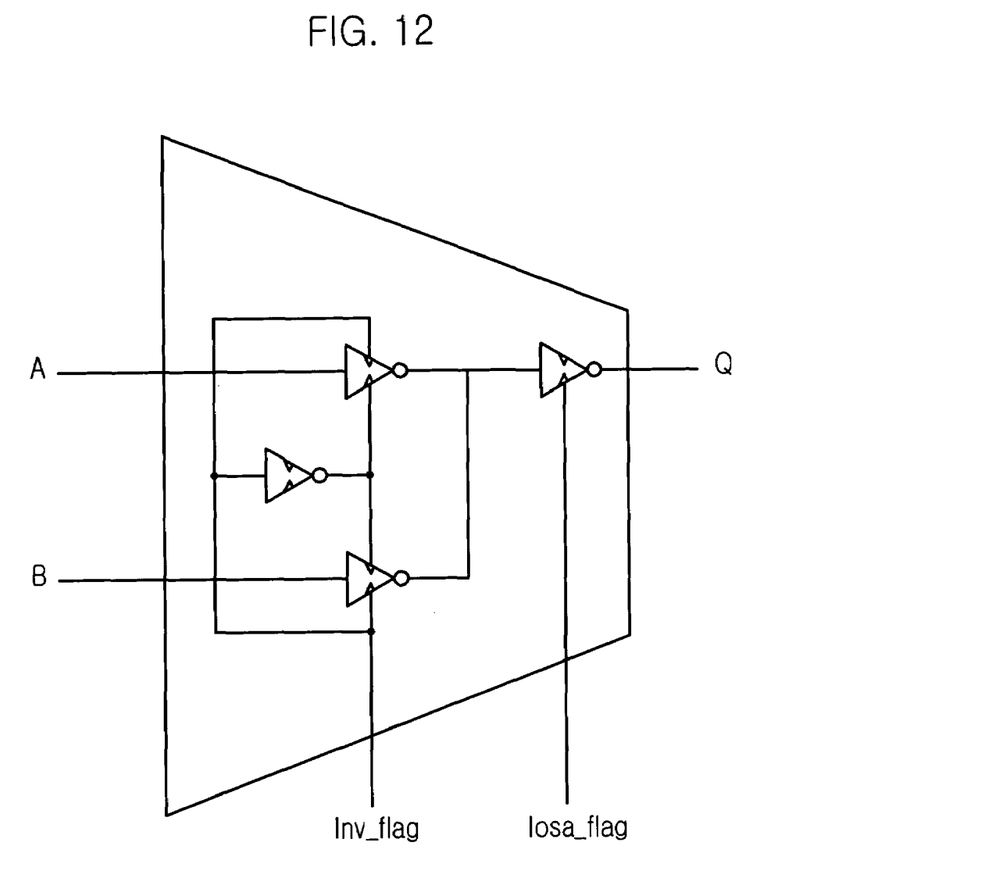
FIG. 12 is a detailed circuit diagram showing a configuration of each of the first and the second data inversion units depicted in FIG. 11.

FIG. 12 is a circuit diagram showing a configuration of each of the first and the second data inversion units 30 and 40 depicted in FIG. 11 in more detail.

Each of the data inversion units 30 and 40 consists of a two-input multiplexer MUX for selectively outputting one of the differential data IO and IOB, according to the inversion flag IF and the data output signal iosa_out.

Figure 13:
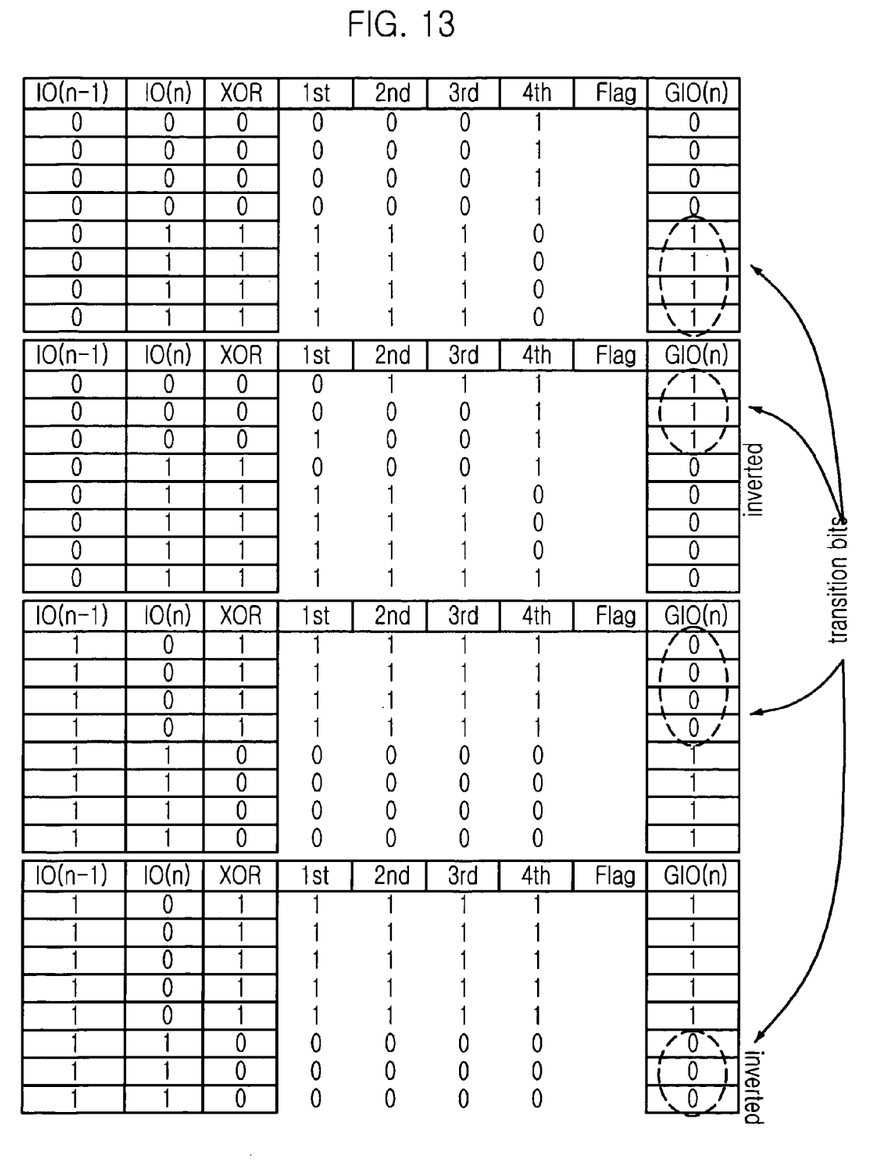
FIG. 13 is an operational truth table showing that internal data is outputted onto the GIO line by the data transmission control apparatus of the present invention if the 8-bit data is transmitted.

FIG. 13 is an operational truth table showing the operation that the internal data is outputted onto the GIO line by the data transmission control apparatus of the invention if the 8-bit data is transmitted.

As in the truth table of FIG. 13, if the number of the phase-changed data is smaller than 5 by a comparison of the (n−1)th data and the nth data, then the nth data is outputted onto the GIO line as it is. Meanwhile, if the number of the phase-changed data is larger than 5, then the inversion flag IF is activated and the phase of the nth data is inverted by the first data inversion unit 30 and outputted onto the GIO line.

After that, a phase of the data transmitted via the GIO line after the phase inversion by the first data inversion unit 30 is again inverted in the second data inversion unit 40. As a result, in the process of the data transmission through the GIO line, the data from the memory core 10 can be outputted as it is, while reducing the number of data being inverted.

Figure 14:
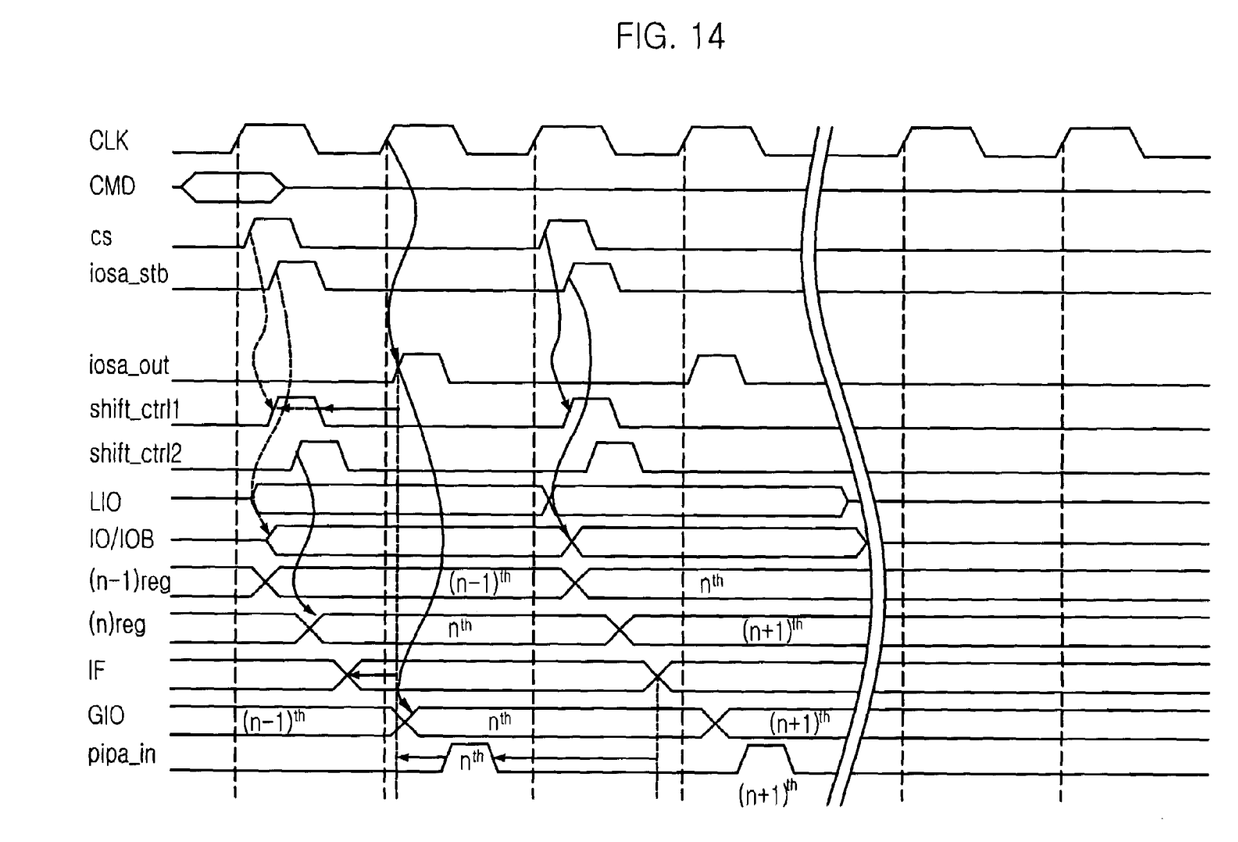
FIG. 14 is a timing diagram representing the operation of the data transmission control apparatus of the invention having the structure as mentioned above.

FIG. 14 is a timing diagram-representing the operation of the data transmission control apparatus of the invention having the structure as mentioned above, in which the operation thereof will be explained shortly with reference to FIG. 14 below.

First, if a chip selection signal cs is activated, then a strobe signal iosa_stb, the data output signal iosa_out, and the shift clock signals Shift_ctrl1 and Shift_ctrl2 are activated. In response to the chip selection signal cs, cell data, i.e., the (n−1)th data is selected from the memory core 10 and transmitted to the IOSA 12 through the GIO line; and the IOSA 12 outputs the nth data IO and IOB in synchronization with the strobe signal iosa_stb. The (n−1)th data is registered in the first register 22 by the shift clock signal Shift_ctrl1 synchronized with the chip selection signal cs and then driven to the state change sensor 26.

Next, cell data, i.e., the nth data is also selected from the memory core 10 by the chip selection signal cs and sent to the IOSA 12 via a local input and output (LIO) line; and the IOSA 12 outputs the nth data IO and IOB in synchronization with the strobe signal iosa_stb. The nth data is registered in the second register 24 by the shift clock signal Shift_ctrl2 synchronized with the chip selection signal cs and then driven to the state change sensor 26.

The state change sensor 26 compares a signal (n−1)reg driven thereto through the first register 22 with a signal (n)reg driven thereto through the second register 24 and outputs a state sensing signal corresponding to each data to the transition rate calculator 28. The transition rate calculator 28 shifts the state sensing signals in the same manner as the foregoing and makes the inversion flag IF activated if data larger than the preset number is transited among the whole data to be transmitted.

If the inversion flag IF is activated, then the phase of the nth data is inverted by the first data inversion unit 30 and sent onto the GIO line; and the nth data transmitted via the GIO line is again inverted in the second data inversion unit 30, allowing the original data from the memory core 10 to be registered in the pipeline or register 14.

Figure 15:
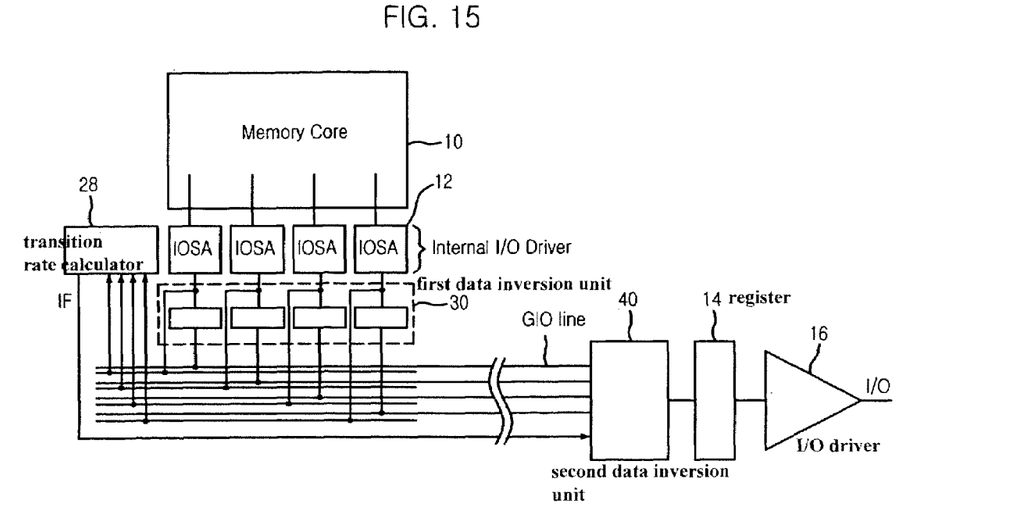
FIG. 15 is a circuit diagram representing a configuration of an on-chip data transmission control apparatus in accordance with a second embodiment of the present invention.

FIG. 15 is a circuit diagram representing a configuration of an on-chip data transmission control apparatus in accordance with a second embodiment of the present invention.

In this embodiment, although it is shown that the data comparison unit 20 is implemented with only the transition rate calculator 28, it should be noted that other composition elements are the same as those in FIG. 2.

In case of this embodiment, although it does not compare the current data with the previous data, the inversion flag IF is activated if the number of high level data in the current data is larger than the preset number. In this case, the on-chip noise can be reduced below ½ compared to the prior art since the transition number of the high data and low data becomes equal. This is because a consumption of a supply voltage VDD to charge the GIO line or a discharge of the ground voltage VSS to discharge the GIO line to the ground level is always incurred only below ½ of the total data number.

Figure 16:
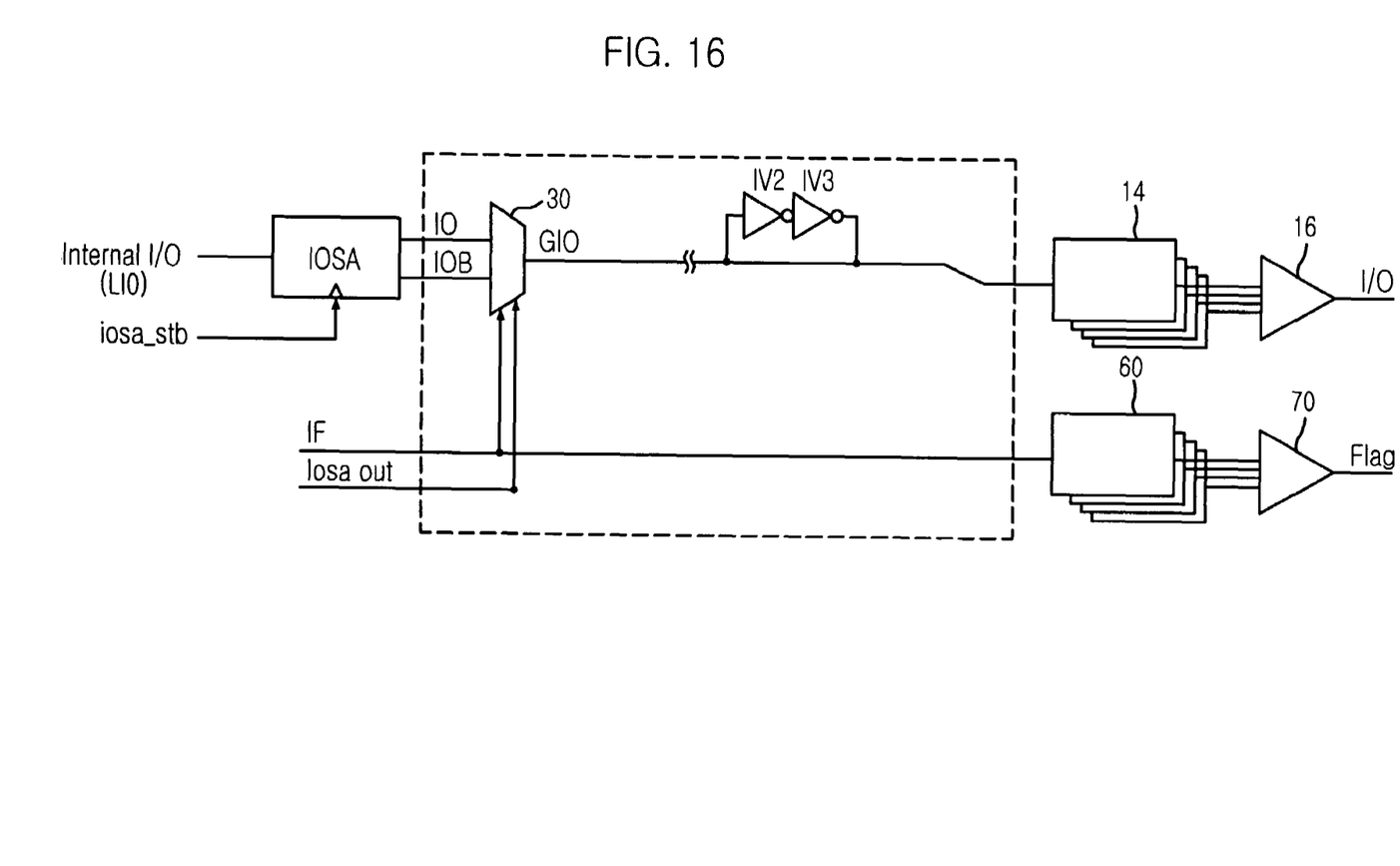
FIG. 16 is a circuit diagram representing a configuration of an on-chip data transmission control apparatus in accordance with a third embodiment of the present invention.

FIG. 16 is a circuit diagram representing a configuration of an on-chip data transmission control apparatus in accordance with a third embodiment of the present invention.

In this embodiment, the apparatus comprises a register 60 and a flag driver 70 for storing and outputting the inversion flag IF, instead of removing the second data inversion unit 40 in FIG. 11. That is to say, in order to decrease the number of data being transited on the internal GIO line as well as the number of data being transited on external IO line (not shown), the data inverted in the first data inversion unit 30 is outputted onto the external IO line immediately, without no additional inversion within the data transmission control apparatus.

Figure 17:
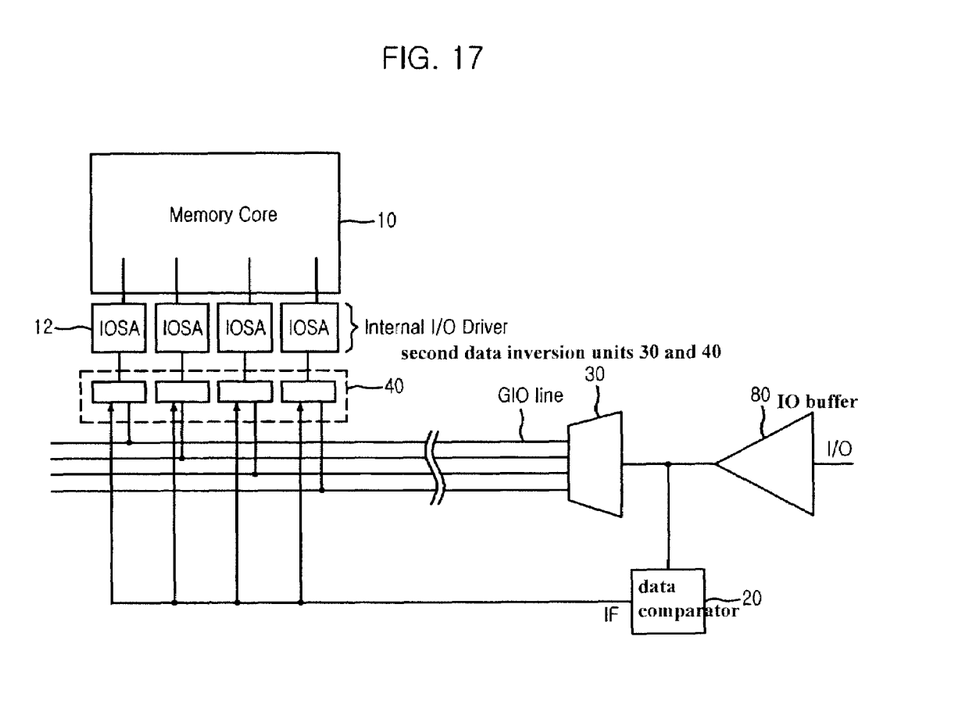
FIG. 17 is a circuit diagram showing an embodiment where a data transmission method of the present invention is applied to a data input device.

FIG. 17 is a circuit diagram showing an embodiment where a data transmission control method of the present invention is applied to a data input device.

The transmission data transition method in accordance with the present invention may also be applied to an instance of storing data receiving through an IO buffer 80 in the memory core 10. That is, as in FIG. 2, states of current data and previous data to be inputted are compared in the data comparison unit 20 to know the number of phase-transited current data; and the inversion flag IF is outputted if the number of the phase-transited current data is greater than the preset number. If the inversion flag IF is activated, then the first inversion unit 30 inverters the current input data provided through the IO buffer 80 and sends inverted data through the GIO line. Meanwhile, the second inversion unit 40 again inverters the input data transmitted through the GIO line and sends inverted data to the IOSA 12.

Further, by implementing the data comparator 20 using only the transition calculator 28 as in the second embodiment above, a phase of each of the input data to the first and the second data inversion units 30 and 40 can be inverted by issuing the inversion flag IF when the number of data with specific phase (e.g., high level) is larger than the preset number.

As described above, the on-chip data transmission control apparatus of the present invention can reduce on-chip noise that largely occurs as the number of data to be transmitted increases, by decreasing transition number of data inputted and outputted via the GIO line, in case of using the multi step pre-patch structure to improve an operation speed of a memory device.

The present application contains subject matter related to Korean patent application No. 2004-116669, filed in the Korean Patent Office on Dec. 30, 2004, the entire contents of which being incorporated herein by reference.

While the present invention has been described with respect to the particular embodiments and drawings, it will be apparent to those skilled in the art that various changes and modifications may be made without departing from the spirit and scope of the invention as defined in the following claims.

What is claimed is:

1. An on-chip data transmission control apparatus comprising:
    a data comparison unit for comparing current data with previous data and issuing an inversion flag if a transition number is larger than a preset number;
    a first data inversion unit for inverting a phase of the current data when the inversion flag is activated to thereby provide inverted data onto a data bus; and
    a second data inversion unit for inverting a phase of the data transmitted via the data bus when the inversion flag is activated to thereby output inverted data,
    wherein the data comparison unit includes:
        a first register for latching the previous data in response to a first control signal and a second control signal;
        a second register for latching the current data in response to a third control signal;
        a state change sensor for comparing the previous data latched in the first register and the current data latched in the second register and activating a state sensing signal when phases of the previous data and the current data are different from each other; and a transition rate calculator for calculating the transition number based on the state sensing signal and issuing the inversion flag if the calculated number is larger than the preset number.

2. The apparatus as recited in claim 1, further comprising a delay circuit for delaying the inversion flag by a preset time and transferring a delayed inversion flag to the second data inversion unit, to compensate a data transmission delay by the operation in the data comparison unit and the first data inversion unit.

3. The apparatus as recited in claim 2, wherein the data comparison unit calculates a number of data bits having a specific phase in the current data and issuing the inversion flag if the calculated number is larger than the preset number.

4. The apparatus as recited in claim 1, wherein the state change sensor includes a plurality of exclusive OR gates for inputting the current data and the previous data and activating the state sensing signal if the phases of the current data and the previous data are different from each other.

5. The apparatus as recited in claim 1, wherein the first data inversion unit inputs differential data of the current data and selectively outputs one of the differential data based on whether or not the inversion flag is activated.

6. The apparatus as recited in claim 1, wherein the second data inversion unit selectively outputs one of the data transmitted via the data bus and the inverted data, depending on whether or not the inversion flag is activated.

7. An on-chip data transmission control apparatus comprising:

a data comparison unit for comparing current data with previous data and issuing an inversion flag if a transition number is larger than a preset number;

a data inversion unit for inverting a phase of the current data when the inversion flag is activated and providing inverted data onto a data bus;

an input and output (IO) driver for temporarily storing data transmitted via the data bus and providing the stored data onto an external IO line; and a flag IO driver for temporarily storing the inversion flag and outputting the stored data to outside, wherein the data comparison unit includes:
a first register for latching the previous data in response to a first control signal and a second control signal;
a second register for latching the current data in response to a third control signal;
a state change sensor for comparing the previous data latched in the first register and the current data latched in the second register and activating a state sensing signal when phases of the previous data and the current data are different from each other; and
a transition rate calculator for calculating the transition number based on the state sensing signal and issuing the inversion flag if the calculated number is larger than the preset number.

8. The apparatus as recited in claim 7, wherein the state change sensor includes a plurality of exclusive OR gates for inputting the current data and the previous data and activating the state sensing signal if the phases of the current data and the previous data are different from each other.

9. The apparatus as recited in claim 7, wherein the data inversion unit inputs differential data of the current data and selectively outputs one of the differential data based on whether or not the inversion flag is activated.

10. The apparatus as recited in claim 7, wherein the data comparison unit calculates a number of data bits having a specific phase in the current data and issuing the inversion flag if the calculated number is larger than the preset number.

11. An on-chip data transmission control method comprising the steps of:
(a) comparing current data with previous data and issuing an inversion flag if a transition number is larger than a preset number;
(b) inverting a phase of the current data when the inversion flag is activated and sending inverted data onto a data bus; and
(c) inverting a phase of the current data sent via the data bus when the inversion flag is activated and outputting inverted data,
wherein the step (a) includes:
latching the previous data in response to a first control signal and a second control signal;
latching the current data in response to a third control signal;
comparing the previous data latched in the first register and the current data latched in the second register and activating a state sensing signal when phases of the previous data and the current data are different from each other; and
calculating the transition number based on the state sensing signal and issuing the inversion flag if the calculated number is larger than the preset number.

12. The method as recited in claim 11, wherein the step (b) selectively outputs one of differential data of the current data based on whether or not the inversion flag is activated.

13. The method as recited in claim 11, wherein the step (c) selectively provides one of the data sent via the data bus and the inverted data depending on whether or not the inversion flag is activated.

14. An on-chip data transmission control method comprising the steps of:
(a) comparing current data with previous data and issuing an inversion flag if a transition number is larger than a preset number; and
(b) inverting a phase of the current data when the inversion flag is activated and outputting inverted data and the inversion flag to outside,
wherein the step (a) includes:
latching the previous data in response to a first control signal and a second control signal;
latching the current data in response to a third control signal;
comparing the previous data latched in the first register and the current data latched in the second register and activating a state sensing signal when phases of the previous data and the current data are different from each other; and
calculating the transition number based on the state sensing signal and issuing the inversion flag if the calculated number is larger than the preset number.

15. An on-chip data transmission control apparatus comprising:
a data comparison unit for comparing current data with previous data and issuing an inversion flag if a transition rate is larger than a preset rate;
a first data inversion unit for inverting a phase of the current data when the inversion flag is activated to thereby provide inverted data onto a data bus; and
a second data inversion unit for inverting a phase of the data transmitted via the data bus when the inversion flag is activated to thereby output inverted data, wherein the data comparison unit includes:
- a first register for latching the previous data in response to a first control signal and a second control signal;
- a second register for latching the current data in response to a third control signal;
- a state change sensor for comparing the previous data latched in the first register and the current data latched in the second register and activating a state sensing signal when phases of the previous data and the current data are different from each other; and
- a transition rate calculator for calculating the transition number based on the state sensing signal and issuing the inversion flag if the calculated number is larger than the preset number.

16. An on-chip data transmission control apparatus comprising:
- a data comparison unit for comparing current data with previous data and issuing an inversion flag if a transition rate is larger than a preset rate;
- a data inversion unit for inverting a phase of the current data when the inversion flag is activated and providing inverted data onto a data bus;
- an input and output (IO) driver for temporarily storing data transmitted via the data bus and providing the stored data onto an external IO line; and
- a flag IO driver for temporarily storing the inversion flag and outputting the stored data to outside, wherein the data comparison unit includes:
- a first register for latching the previous data in response to a first control signal and a second control signal;
- a second register for Latching the current data in response to a third control signal;
- a state change sensor for comparing the previous data latched in the first register and the current data latched in the second register and activating a state sensing signal when phases of the previous data and the current data are different from each other; and
- a transition rate calculator for calculating the transition number based on the state sensing signal and issuing the inversion flag if the calculated number is larger than the preset number.

* * * * *